US 6,612,596 B2

(12) United States Patent
Jeon et al.

(10) Patent No.: US 6,612,596 B2
(45) Date of Patent: Sep. 2, 2003

(54) FOLDABLE FOOTSTOOL DEVICE FOR A VEHICLE

(76) Inventors: Jun-Sung Jeon, Sungwon Apt., 107-103, #30 Sangyhun, Suji-Eub, Yongin-City, Kyungki-Do 449-840 (KR); Dong-Ho Kang, Sungwon Apt., 102-1202, #532-35 Pung-Dong, Iisan-Ku, Goyang-City, Kyungki-Do 411-330 (KR)

( * ) Notice: Subject to any disclaimer, the term of this patent is extended or adjusted under 35 U.S.C. 154(b) by 0 days.

(21) Appl. No.: 10/016,125

(22) Filed: Dec. 17, 2001

(65) Prior Publication Data

US 2002/0083868 A1 Jul. 4, 2002

(30) Foreign Application Priority Data

Dec. 15, 2000 (KR) .......................................... 2000-77160

(51) Int. Cl.[7] ................................................. B60R 3/00
(52) U.S. Cl. ........................ 280/166; 182/91; 105/447
(58) Field of Search .............................. 312/235.1, 275; 280/5.28, 291, 163, 166; 108/11, 134, 44; 105/446, 447; 182/91

(56) References Cited

U.S. PATENT DOCUMENTS

| 1,471,972 A | * | 10/1923 | Miller | 280/166 |
| 1,523,311 A | * | 1/1925 | Swayze et al. | 105/447 |
| 2,409,418 A | * | 10/1946 | Carmicheal | 280/166 |
| 3,229,993 A | * | 1/1966 | Riddle | 280/166 |
| 3,762,742 A | * | 10/1973 | Bucklen | 280/166 |
| 4,175,495 A | * | 11/1979 | Kleim | 105/450 |
| 4,412,686 A | * | 11/1983 | Fagrell | 280/166 |
| 5,882,095 A | * | 3/1999 | Green | 312/235.3 |

FOREIGN PATENT DOCUMENTS

CH               663 765 A5 * 1/1988

* cited by examiner

Primary Examiner—Lanna Mai
Assistant Examiner—Gerald A. Anderson
(74) Attorney, Agent, or Firm—Burns, Doane, Swecker & Mathis, L.L.P.

(57) ABSTRACT

A foldable footstool device for a vehicle of the present invention comprises a main beam fixed to a lower surface of a lower part of a vehicle and having hinge holes and stoppers at left and right sides thereof, respectively; a footstool installed rotatably about said hinge holes of the main beam and being supported by the stoppers; a first shaft extended from an end of the footstool; a link portion linking a lower inner wall of a door and a side sill of the lower part of the vehicle; a second shaft connected to the link portion in order to rotate in response to a rotation of the link portion; and a bevel gear part having a horizontal gear connected to the first shaft and a vertical gear connected to the second shaft. According to such foldable footstool device for a vehicle, the footstool is unfolded when the door is opened and the footstool is folded when the door is shut so that a width of the vehicle decreases in a state that the door is closed.

4 Claims, 4 Drawing Sheets

FOLDABLE FOOTSTOOL DEVICE FOR A VEHICLE

This application claims priority under 35 U.S.C. §§119 and/or 365 to 2000-77160 filed in Republic of Korea on Dec. 15, 2000; the entire content of which is hereby incorporated by reference.

BACKGROUND OF THE INVENTION

Field of the Invention

The present invention is related to a footstool device for a vehicle, and more particularly, to a foldable footstool device for a vehicle in which a footstool can be unfolded or folded in response to opening or shutting of door of a vehicle.

Information Disclosure Statment

In general, a footstool for a vehicle is applied to a jeep, mini van and mini bus, the footstool is fixed to and protruded from a lower body located under the door of the vehicle so that a passenger to be take a vehicle can step on the footstool.

Such conventional footstool for the vehicle is always protruded from a side of the lower part of the vehicle, thus there is a defect that a width of the vehicle increases as much as a size of the protruded footstool.

Therefore, it is an object of the present invention to solve a problem of the footstool of the vehicle as described above and to improve it.

It is a further object of the invention to provide a foldable footstool device for a vehicle that can be unfolded when a door of the vehicle is opened and can be folded when the door of the vehicle is shut.

SUMMARY OF THE INVENTION

In order to achieve the above objects, the a foldable footstool device for a vehicle according to the present invention comprises a foldable footstool device for a vehicle comprising; a main beam fixed to a lower surface of a lower part of a vehicle and having hinge holes and stoppers at left and right sides thereof, respectively; a footstool installed rotatably about said hinge holes of the main beam and being supported by the stoppers; a first shaft extended from an end of the footstool; a link portion linking a lower inner wall of a door and a side sill of the lower part of the vehicle; a second shaft connected to the link portion in order to rotate in response to a rotation of the link portion; and a bevel gear part having a horizontal gear connected to the first shaft and a vertical gear connected to the second shaft.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For full understanding of the nature and objects of the invention, reference will be made to the following detailed description taken in conjunction with the accompanying drawings in which.

Similar reference characters refer to similar parts throughout several views of the drawings.

DETAILED DESCRIPTION OF THE INVENTION

Figure 1:
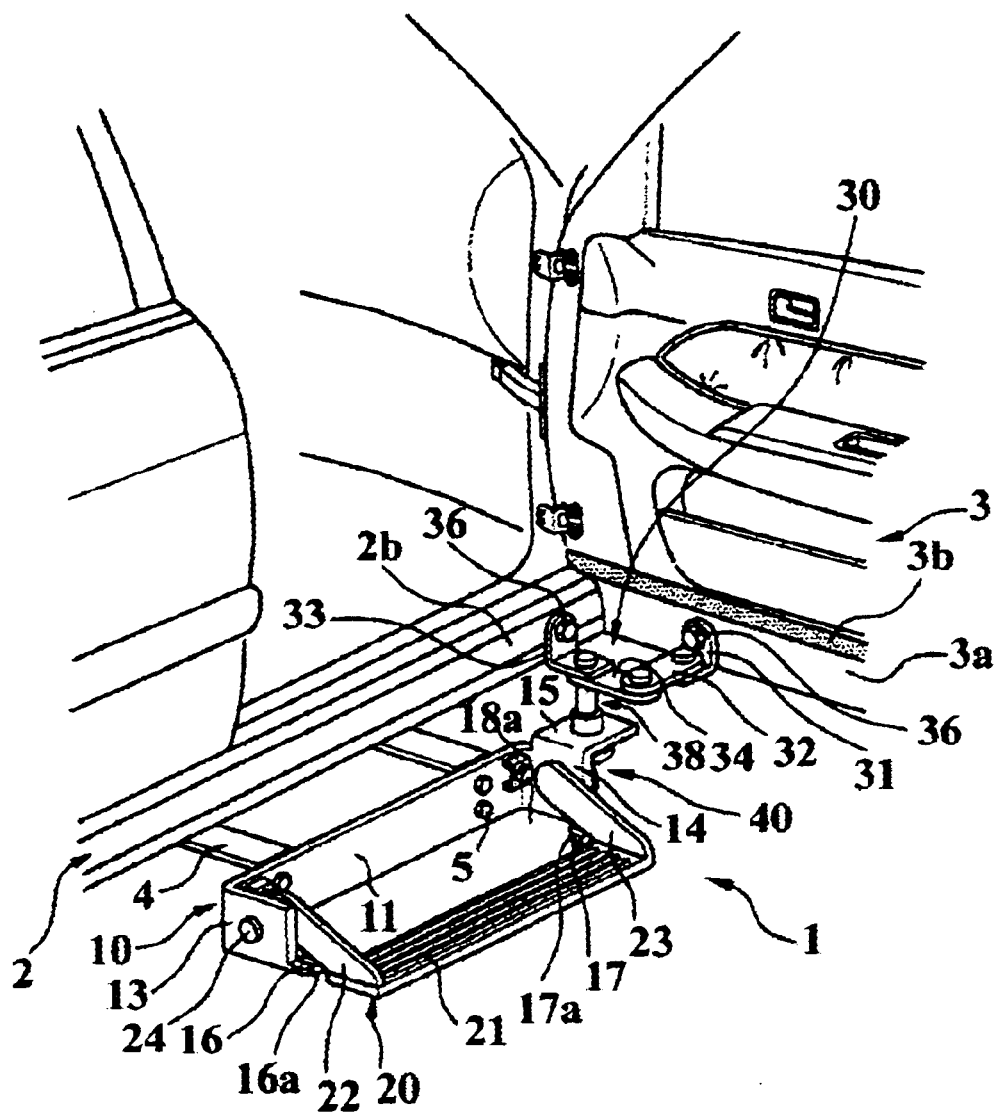
FIG. 1 is an assembled perspective view of a foldable footstool device for a vehicle according to the present invention.
Figure 2:
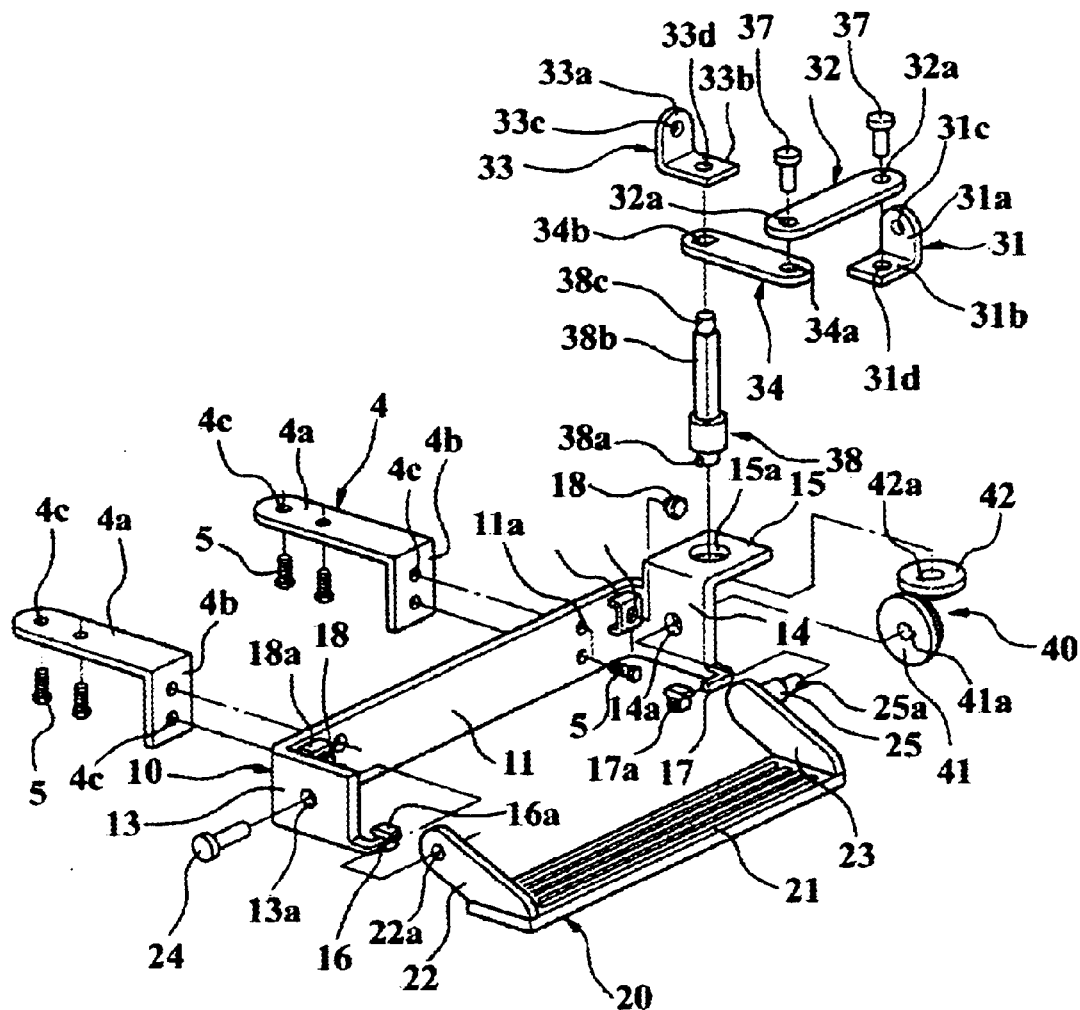
FIG. 2 is an exploded perspective view of FIG. 1.

Referring to FIG. 1 and FIG. 2, in a footstool device 1 of the present invention, a main beam 10 is fixed to a lower surface 2a of a lower body 2 of a vehicle by two fixing brackets 4. Each fixing bracket 4 is bent at a right angle, and each fixing bracket 4 is divided into a first and second parts 4a and 4b at both sides of the bending portion regarding as a reference. Two combining holes 4c are formed at the first part 4a and the second part 4b, respectively. Each combining member 5 is combined with the combining hole 4c of the first part 4a of the each fixing bracket 4 so that the each fixing bracket 4 is fixed to the lower surface 2a of the lower part 2 of the vehicle. Two combining holes 11a are formed at vicinities of both edge portions of a front surface 11 of the main beam 10. The combining member 5 is combined with the combining hole 4c of the second part 4b of the fixing bracket 4 and the combining hole 11a of the main beam 10 so that the front surface 11 of the main beam 10 is fixed to the fixing bracket 4.

Hinge holes 13a and 14a are formed at left and right sides 13 and 14 of the main beam 10, respectively. At the right side 14 of the main beam 10, an extended portion 15 which is bent at a right angle is formed, a through hole 15a is formed at a center of the extended portion 15. Also, extended stoppers 16 and 17 are formed at lower ends of the left and right sides 13 and 14 of the main beam 10, respectively, buffer members 16a and 17a made of rubber are fixed to the stoppers 16 and 17, respectively. Two bumpers 18 are mounted at a center of the front surface 11 of the main beam 10, the bumper 18 is inserted in a hole 18b of a protruded portion 18a formed at the front surface 11 of the main beam 10.

A footstool 20 comprises a plate 21, support members 22 and 23 are formed at right and left sides of the plate 21, respectively. A hinge hole 22a is formed at the left support member 22 and an extended first shaft 25 is fixed to the right support member 23. The first shaft 25 is divided into two portions having different diameters from each other, a key 25a is formed at and protruded from a small diameter portion. A height of the key 25a is same as a large diameter portion. The hinge hole 13a of the left side 13 of the main beam 10 and the hinge hole 22a of the left support member 22 of the footstool 20 are connected from each other by a hinge pin 24, the first shaft 25 of the right support member 23 of the footstool 20 penetrates through the hinge hole 14a of the main beam 10. Thus, the footstool 20 can be rotated about the hinge holes 13a and 14a of the main beam 10. At this point, the hinge pin 24 is riveted after penetrating through the hinge holes 13a and 22a.

Figure 5:
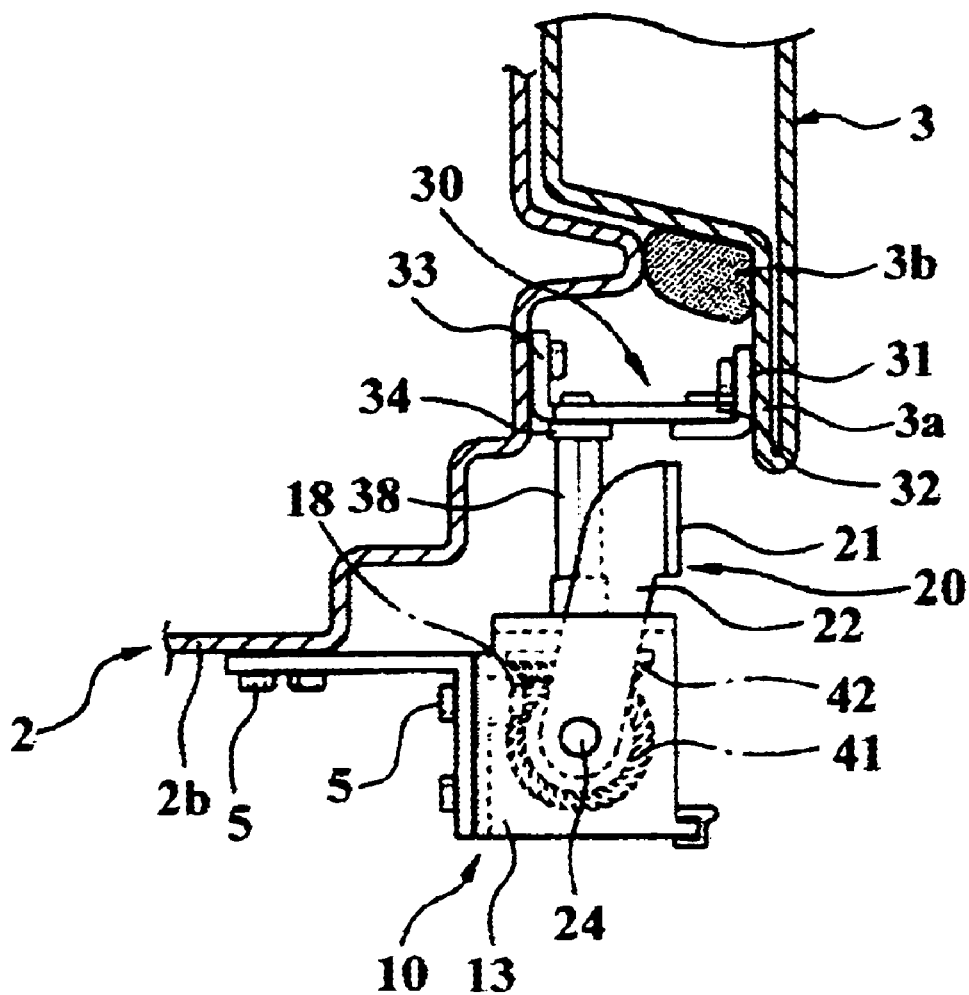
FIG. 5 is a side view showing a foldable footstool device of FIG. 1 when a door is shut.

As shown in FIG. 5, a link portion 30 is located between a side sill 2b of the lower part 2 of the vehicle and a lower inner wall 3a of the door 3. The side sill 2b has steps formed toward an inner side of the vehicle. The side sill 2b and the lower inner wall 3a of the door 3 are formed such that a space is formed between the side sill and the lower inner wall when the door is shut. Accordingly, the link portion 30 and a shaft 38 are located in this space. When the door is shut, the door 3 is contacted with the side sill 2b at the lower inner wall 3a of the door 3 by a sealing portion 3b formed on the link portion 30 so that door is sealed with respect to the lower part 2 of the vehicle.

Again, referring to FIG. 1, and FIG. 2, the link portion 30 is constituted of a first bracket 31 fixed to the lower inner wall 3a of the door 3, a first link 32 linked to the first bracket 31, a second bracket 33 fixed to the side sill 2b of the lower part of the vehicle and a second link 34 linking the second bracket 33 and the first link 32. The first and second brackets 31 and 33 are bent at right angle, combining holes 31c and 33c are formed on the first parts 31a and 33a of the brackets, respectively. A combining member 36 is combined with each of the combining holes 31c and 33c so that the first and second brackets 31 and 33 are fixed to the lower inner wall 3a of the door 3 and the side sill 2b of the lower part 2 of the vehicle, respectively. Also, a hinge hole 31d is formed at a second portion 31b of the first bracket 31, hinge holes 32a are formed at both ends of the first link 32 and a hinge hole 34a is formed at an end of the second link 34. The first bracket 31, the first link 32 and the second link 34 are connected from each other by inserting a hinge pin 37 into the hinge holes 31d, 32a and 34a. The hinge pin 37 is riveted after penetrating through the hinge holes 31d, 32a and 34a.

The second bracket 33 and the second link 34 are connected to each other by a second shaft 38. As shown in FIG. 2 which is an exploded view, the second bracket 33 is connected to the first shaft 38 by the hinge hole 33d formed at the second part 33b, a section of a hinge portion 38c of the second shaft 38 which is contacted with the hinge hole 33d of the second bracket 33 is circular shape. Also, the second link 34 is connected to the second shaft 38 by a rectangular shaped combining hole 34b formed at another end thereof, a section of a connecting portion 38b of the second shaft, which is contacted with the combining hole 34b of the second link 34, is a rectangular shape. Therefore, the second shaft 38 is rotated in response to a rotation of the second link 34. That is, when the door 3 of the vehicle is opened or shut, the link 34 is rotated in response to a rotation of the door 3, whereby the second shaft 38 is rotated. The second shaft 38 penetrates through a through hole 15a of the extended portion 15 of the main beam 10. A key 38a is formed at another end of the second shaft 38.

Figure 3:
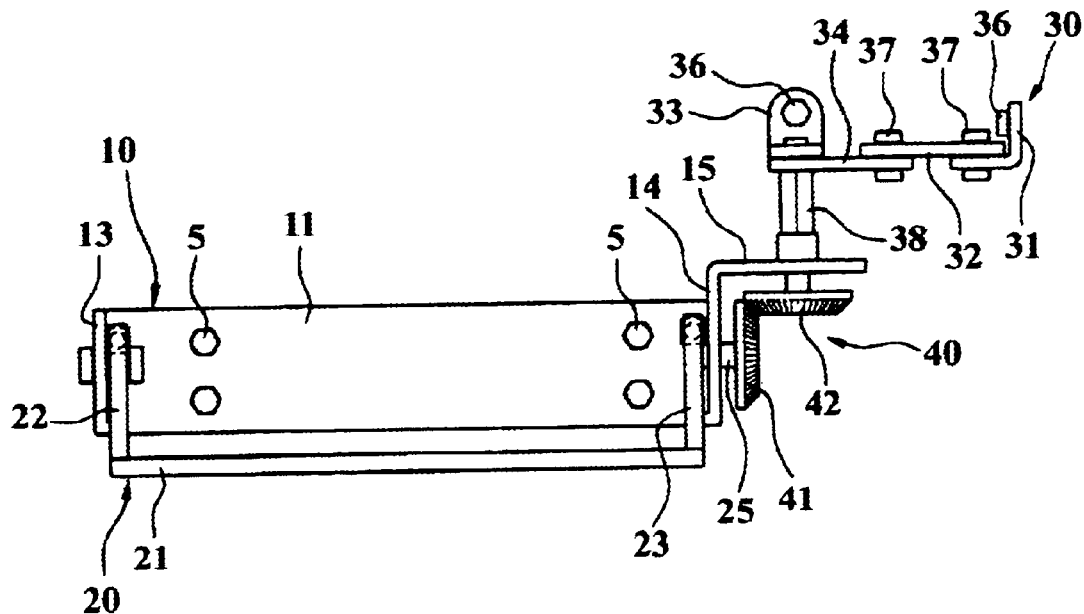
FIG. 3 is a front view of FIG. 1.

As shown in FIG. 3, a bevel gear part 40 is installed between the right side 14 of the main beam 10 and the extended portion 15. In the bevel gear part 40, a horizontal bevel gear 41 is meshed with a vertical bevel gear 42. The horizontal bevel gear 41 is fixed to the first shaft 25 of the footstool 20 which penetrates through the right side 14 of the main beam 10, and the vertical bevel gear 42 is fixed to the second shaft 38 connected to the second link 33 of the link portion 30. Keys 25a and 38a are formed at the first and second shafts 25 and 38, respectively, and key seats 41a and 42a are formed at the horizontal and vertical bevel gears 41 and 42, respectively. Therefore, the shafts and the gears are combined with each other and a rotation movement is transmitted.

Figure 4:
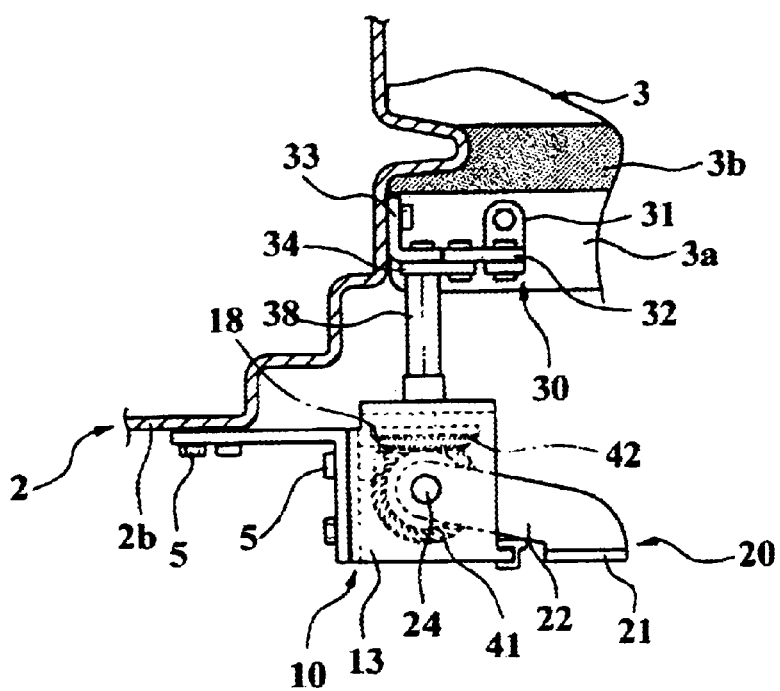
FIG. 4 is a side view showing a foldable footstool device of FIG. 1 when a door is opened.

An operation of the foldable footstool device of the present invention having a constitution as described above will be described in conjunction with FIG. 4 and FIG. 5.

First at all, when the door 3 in closed state opens, the first link 31 of the link portion 30 is rotated in counterclockwise direction, the second shaft 38 connected to the first link 31 is rotated in counterclockwise direction in response to the rotation of the first link. When the second shaft 38 is rotated in counterclockwise direction, the vertical bevel gear 42 connected to the second shaft is rotated in counterclockwise direction, and the horizontal bevel gear 41 meshed with the vertical bevel gear 42 is rotated in clockwise direction. Accordingly, the first shaft 25 of the footstool 20 connected to the horizontal bevel gear 41 is rotated in clockwise direction so that the footstool 20 is rotated downward. Also, since the stoppers 16 and 17 are formed at the main beam 10, the left and right support members 22 and 23 of the footstool 20 are supported by the stoppers 16 and 17 of the main beam 10, therefore, the left and right support members are not moved downwardly any more. Especially, a rotational shock impacted on the footstool 20 decreases due to the buffer members 16a and 17a.

To the contrary, when the door 3 in open state shuts, the first link 31 of the link portion 30 is rotated in clockwise direction, the second shaft 38 connected to the first link 31 is rotated in clockwise direction in response to the rotation of the first link. When the second shaft 38 is rotated in clockwise direction, the vertical bevel gear 42 connected to the second shaft is rotated in clockwise direction, and the horizontal bevel gear 41 meshed with the vertical bevel gear 42 is rotated in counterclockwise direction. Accordingly, the first shaft 25 of the footstool 20 connected to the horizontal bevel gear 41 is rotated in counterclockwise direction so that the footstool 20 is rotated upward and then maintains in upright state. Also, even if the left and right support members 22 and 23 of the footstool 20 are rotated excessively, since the bumper 18 is mounted to the main beam 10, the left and right support members 22 and 23 are supported by the bumper 18 so that a rotational shock impacted on the footstool 20 decreases.

Here, a rotational angle of the footstool 20 with respect to an opening angle of the door 3 can be set by adjusting a gearing ratio of the bevel gear part 40.

In conclusion, the footstool 20 is rotated downward automatically in response to an opening of the door 3 and then supported by the stoppers 16 and 17 of the main beam 10, the footstool 20 is rotated upward in response to a shut of the door 3 and then is maintained in upright state.

According to the foldable footstool device for the vehicle of the invention as described above, the footstool is unfolded when the door is opened and the footstool is folded when the door is shut so that a width of the vehicle decreases in a state that the door is closed.

Although this invention has been described in its preferred form with a certain degree of particularity, it is appreciated by those skilled in the art that the present disclosure of the preferred form has been made only by way of example and that numerous changes in the details of the construction, combination, and arrangement of parts may be resorted to without departing from the spirit and scope of the invention.

What is claimed is:

1. A foldable footstool device for a vehicle comprising:
   a main beam fixed to a lower surface of a lower part of a vehicle and having hinge holes and stoppers at left and right sides thereof, respectively;
   a footstool installed rotatably about said hinge holes of said main beam between raised and lowered positions, said footstool being supported by said stoppers in said lowered position;

a first shaft extended from an end of said footstool and passing through one of said hinge holes to define an axis of rotation of said footstool;

a link portion linking a lower inner wall of a door and a side sill of the lower part of the vehicle;

a second shaft connected to said link portion in order to rotate in response to a rotation of said link portion; and a bevel gear part having a horizontal gear connected to said first shaft and a vertical gear connected to said second shaft, the horizontal and vertical gears meshing to automatically rotate said footstool between said raised and lowered positions in response to closing and opening, respectively, of said door.

2. The foldable footstool device of claim 1, wherein said link portion comprises a first bracket fixed to said lower inner wall of said door; a first link connected to said first bracket; a second bracket fixed to said side sill of said lower part of the vehicle; and a second link connecting said first link and said second bracket.

3. The foldable footstool device of claim 2, wherein said second bracket and said second link are connected to each other by said second shaft.

4. The foldable footstool device of claim 3, wherein a portion of said second bracket connected to said second shaft has a hinge hole, a section of a hinge portion of said second shaft contacted with said hinge hole of said second bracket is a circular shape, a portion of said second link connected to said second shaft has a rectangular combining hole, and a section of a combining portion of said second shaft contacted with said combining hole of said second link is a rectangular shape.

* * * * *